Figure 1:
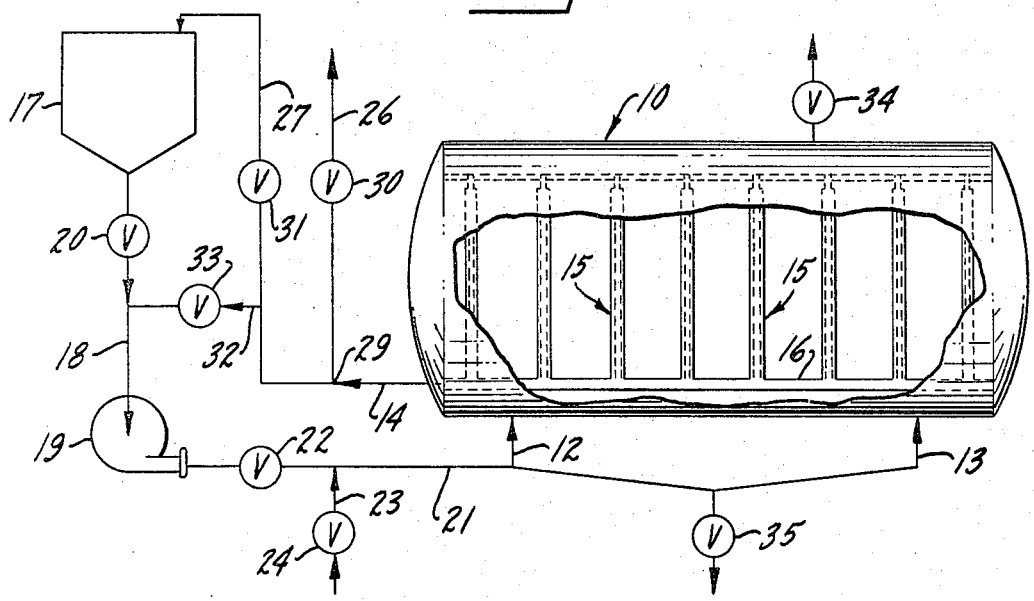

April 9, 1968 J. R. CAPECCI 3,377,270
PROCESS OF REMOVING IMPURITIES WITH A MIXTURE
OF CATION AND ANION RESINS
Filed Feb. 23, 1965

INVENTOR.
Joseph R. Capecci,
BY
Hume, Groen, Clement & Hume
Attorneys.

United States Patent Office 3,377,270
Patented Apr. 9, 1968

3,377,270
PROCESS OF REMOVING IMPURITIES WITH A MIXTURE OF CATION AND ANION RESINS
Joseph R. Capecci, Bronx, N.Y., assignor to Union Tank Car Company, Chicago, Ill., a corporation of New Jersey
Filed Feb. 23, 1965, Ser. No. 434,562
6 Claims. (Cl. 210—37)

This invention relates to a method for removing impurities from liquids and, more particularly, to a method of removing impurities from liquids with a mixture of cation and anion resin particles in the size range of about 60 to 400 mesh.

It has recently been discovered that improved removal of impurities from a fluid may be obtained by passing the fluid through a filter screen pre-coated with a layer of ion exchange resin particles in the size range of about 60 to 400 mesh, hereinafter referred to sometimes as "finely divided" resin particles. This method is disclosed and claimed in Joseph A. Levendusky's copending application Ser. No. 263,999, filed Mar. 8, 1963, now patent No. 3,250,703, and assigned to the same assignee as this application. Furthermore, beds of the finely divided resin particles may be used to remove impurities from fluids, though this is not as effective or as practical as the techniques disclosed in the above-mentioned co-pending application. As used hereinafter the term "bed" refers to a layer, such as a pre-coat layer which has been deposited on a filter screen, a film, a deep or shallow bed or the like.

It is generally preferred to use a mixture of anion and cation finely divided resin particles because the resin particles "clump" or agglomerate with one another thereby reducing the pressure drop across a bed of the resin particles. However, in the production of such anion and cation resin particles in the size range of about 60 to 400 mesh, resin particles smaller than 400 mesh are produced, hereinafter referred to sometimes as resin particle "fines." A major portion of these resin particle fines will be in the size range of about 5 to 37 microns. The presence of the resin particle fines may cause an increase in the pressure drop across a bed of finely divided resin particles. Reduced pressure drop across the bed of finely divided resin particles are desirable in an impurity removal system as it permits smaller pumps and/or larger flow rates in the system. Furthermore, these resin particle fines may cause channeling and poor flow distribution of the liquid passing through a pre-coat layer of finely divided resin particles, which reduces the quality of the effluent and requires filter screen cleaning or replacement. The resin particle fines may cause filter screen plugging also.

It is therefore an object of the present invention to provide a method for reducing the pressure drop across a bed comprising a mixture of anion and cation exchange resin particles in the size range of about 60 to 400 mesh which contain resin particles smaller than 400 mesh, and more particularly, resin particle fines in the size range of about 5 to 37 microns.

It is another object to provide a method of preparing a pre-coat for a filter screen comprising a mixture of anion and cation exchange resin particles in the size range of about 60 to 400 mesh containing resin particle fines smaller than 400 mesh.

It is a further object to provide a method of preparing a slurry of pre-coat medium for depositing on a filter screen, said pre-coat medium comprising a mixture of finely divided anion and cation exchange resin particles containing resin particle fines smaller than 400 mesh.

It is still another object to provide a method of removing impurities from a liquid with a bed of finely divided cation and anion exchange resin particles containing resin particle fines smaller than 400 mesh.

These and other objects more apparent hereinafter are accomplished in accordance with the present invention by adding sufficient anion or cation exchange resin particles in the size range of about 5 to 37 microns to a slurry of anion and cation finely divided resin particles containing resin particle fines smaller than 400 mesh to clarify the slurry supernatant formed upon settling the slurry. The finely divided resin particles in such a slurry provide a filter bed having reduced pressure drop to the liquid passing therethrough during treatment.

Figure 2:
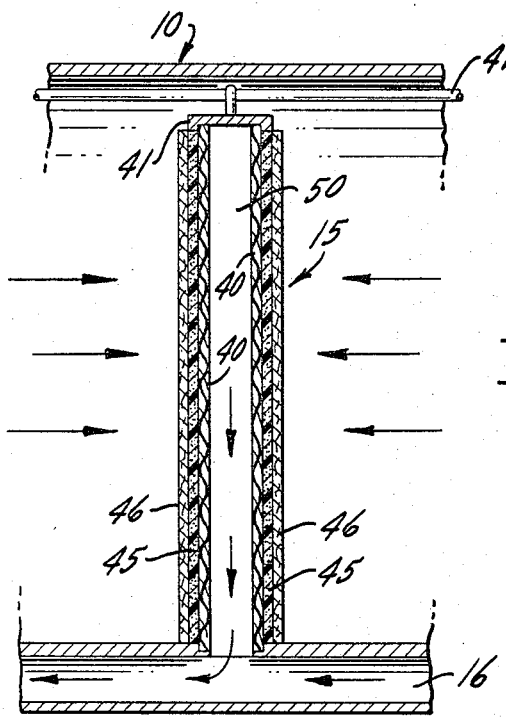

The invention, both as to its organization and method of operation, taken with further objects and advantages thereof, will best be understood by reference to the following description taken in conjunction with the accompanying drawings, in which:

FIGURE 1 is a schematic representation of a filtering system embodying the features of the present invention, the filter tank of the system being partially cut away to illustrate the filters in the filter tank; and FIGURE 2 is an enlarged cross-sectional view of one of the filters illustrated in FIGURE 1, illustrating the filter screen, the pre-coat layer, and a filter cake.

Referring to the drawings, and more particularly to FIGURE 1, there is illustrated schematically a filter system for removing dissolved and undissolved impurities from a liquid in accordance with the present invention.

The present invention has application to the purification of liquids, for example, the removal of formic acid from formaldehyde, the removal of color bodies and ash from sugar solutions, the conversion of potassium ions to sodium ions in wines and the removal of dissolved and undissolved impurities in water streams for industrial, domestic and potable uses. In this instance, it will be discussed in detail with respect to the purification of a steam condensate water in a steam generating system of an electrical power plant.

The filter system is of the type disclosed in detail in the above-mentioned copending application Ser. No. 263,-999 and includes a filter tank, indicated generally by reference numeral 10, having inlet lines 12 and 13 and an outlet line 14. Mounted within the filter tank 10 are a plurality of filters, indicated generally by reference numerals 15. The filters 15 are connected to an outlet header 16 which in turn is connected to the outlet line 14. The condensate to be treated passes into the filter tank 10 via lines 12 and 13 and through the filters 15, is collected in the outlet header 16 and leaves the filter tank 10 through the outlet line 14.

A liquid slurry of the particular pre-coat medium, a mixture of finely divided anion and cation exchange resin particles in the size range of about 60 to 400 mesh, is prepared in accordance with the method of the present invention and stored in a pre-coat tank 17. A slurry line 18, controlled by a slurry valve 20, connects the pre-coat tank 17 with a slurry pump 19. A transfer line 21 connects the pump 19 with the inlet lines 12 and 13 of the filter tank 10. A transfer valve 22 adjacent the pump 19 and in the transfer line 21 controls the passage of slurry or liquid from the pump 19.

The condensate water to be treated enters the filter system through the feed line 23 having an intake control valve 24. The feed line 23 is connected to the transfer line 21 between the control transfer valve 22 and the inlet line 12.

The outlet line 14 from the filter tank 10 is connected to a service line 26 and a pre-coat return line 27 at a T-juncture indicated by reference numeral 29. The service line 26 is connected to service units not shown, such as a steam generator and the like, and has a service valve 30. The pre-coat return line 27 is connected to the pre-coat tank 17 and has a return valve 31 to control the flow of slurry back to the pre-coat tank 17.

A bridge line 32 with a bridge valve 33 interconnects the pre-coat return line 27 and the slurry line 18. The filter tank 10 is equipped with a vent valve 34 and a drain valve 35.

Referring to FIGURE 2, each filter 15 comprises two spaced filter screens 40 held at their upper edges by a bracket 41 which is attached to a longitudinally extending brace 42 suitably mounted in the filter tank 10. A peripheral seal (not shown) closes the outer edges of the filter screens 40 to form a chamber 50 therebetween which directly communicates with the outlet header 16. Thus, water entering the filter tank 10 must pass through the filter screens 40 into the chamber 50 and is withdrawn from the filter tank 10 through the outlet header 16. The flow of the water through the filter tank 10 is represented by the arrows in FIGURE 2.

During the pre-coating step a pre-coat layer 45 of a mixture of finely divided anion and cation exchange resin particles in the size range of about 60 to 400 mesh is deposited upon the upstream sides of the filter screens 40, i.e., the sides where the condensate water is introduced into the filter screens 40. Similarly, during the filtering step a filter cake 46 builds up within and on the upstream side of the pre-coat layer 45.

In preparing the filter system for operation the initial step is to pre-coat the filter screen 40. To these ends, the filter tank 10 is filled with a low impurity liquid, in this instance demineralized water. A slurry of pre-coat medium and demineralized water is prepared in the pre-coat tank 17, the pre-coat medium being a mixture of anion and cation exchange resin particles in the size range of about 60 to 400 mesh. It is preferable to employ ion exchange resin particles in the size range of about 100 to 400 mesh, the most preferred range being 200 to 400 mesh. It is further preferred that a major portion of the ion exchange resin particles comprise, on a weight basis, particles in the size range of 100 to 400 mesh, most preferably 200 to 400 mesh.

The finely divided cation and anion resin particles, however, contain about 0.5 to 10% by weight anion and cation resin particle fines, i.e., cation and anion resin particles smaller than 400 mesh. A major portion of the resin particle fines will be in the size range of about 5 to 37 microns. These resin particle fines may cause an increase in the pressure drop across the pre-coat layer 45. Furthermore, these resin particle fines may cause channeling and flow distribution of the liquid passing through the pre-coat layer 45 and filter screen plugging. The present invention reduces the pressure drop across the pre-coat layer 45, affords a pre-coat medium which may be evenly deposited as a bed or as a pre-coat layer on a filter screen, and reduces filter screen plugging.

In accordance with the present invention, a measured amount of anion and cation finely divided resin particles containing resin particle fines are mixed in a measured amount of demineralized water in the pre-coat tank 17 to form a homogeneous slurry. A sample is drawn from the slurry and divided into two parts by placing it in two graduated cylinders or the like. The slurry samples are allowed to settle for 5–10 minutes. If the supernatant is cloudy, the volume of each slurry sample is recorded. This provides the data to later determine the amount of slurry or resin particles which were treated. To the cloudy contents of one graduated cylinder there is added a measured small amount of anion exchange resin particle fines in the size range of about 5 to 37 microns, the slurry shaken and then allowed to settle for 5–10 minutes. The same procedure is followed with the cloudy contents of the other cylinder, except that small amounts of cation exchange resin particle fines in the size range of about 5 to 37 microns are added. This procedure is repeated with each cylinder until the supernatant of one of the cylinders begins to clarify. This will reveal whether anion or cation fines are needed to clarify the slurry. Then the kind of fines which clarify the slurry are added in measured amounts to such cylinder only until a clear supernatant is observed. The amount of anion or cation resin particle fines necessary to clarify the contents of such cylinder is thereby determined, and with this information the amount of anion or cation resin particle fines that will clarify the slurry in the pre-coat tank 17 is calculated. Such amount of anion or cation exchange resin particle fines is added to and mixed with the slurry in the pre-coat tank 17. The resin particles in the slurry are ready to be pre-coated upon the filter 15.

A water-soluble resinous polyelectrolyte may be added to the slurry prior to pre-coating, if desired. The use of these polyelectrolytes with finely divided resin particles is described and claimed in Joseph A. Levendusky's copending application Ser. No. 323,177, filed Nov. 12, 1963, now Patent No. 3,250,704, and assigned to the same assignee as the present application.

During the pre-coating step all the valves are closed, except the slurry valve 20, the transfer valve 22 and the return valve 31. The pre-coating step is initiated by starting the pump 19, thereby drawing the resin pre-coat slurry from the pre-coat tank 17 and through the slurry line 18 to the pump 19. The slurry is forced by the pump 19 through the transfer line 21 and the inlet lines 12 and 13 into the filter tank. The pressure of the incoming slurry forces the demineralized water in the filter tank 10 through the filters 15 and the chamber 50 and out of the filter tank 10 via the outlet header 16 and the outlet line 14. This demineralized water enters the pre-coat tank 17 through the return line 27.

As the cycling continues the pre-coat slurry is brought into contact with the upstream surfaces of the filter screens 40 of the filters 15. The mixture of anion and cation exchange resin particles of the pre-coat medium are separated from the slurry and deposited as the pre-coat layer 45 upon the upstream surfaces of the screens 40. Because of the fine size of the ion exchange resin particles in the pre-coat medium, a small pressure differential across the filter screens 40 suffices to maintain the resin pre-coat layer 45 in place. The slurry is circulated through the filter system in this manner until a sufficient depth of the resin pre-coat layer 45 is deposited upon the upstream surface of the filter screens 40. The apertures of the filter screens 40 must, of course, be small enough to cause the finely divided resin particles to deposit upon the upstream side and form the pre-coat layer 45.

The thickness of the pre-coat layer 45 may be greater than a few inches, but it is preferred that the layer 45 have a thickness in the range of about 1/16 to 2 inches, more preferably about 1/8 to 1 inch, and most preferably 1/8 to 5/8 inch.

The pre-coating step is terminated by closing the valve 20 and the return valve 31 and opening the bridge valve 33. The pump 19 is kept running until the recycle stream is clear. The filter system is now ready to be used to treat the feed water.

The service run is begun by closing the bridge valve 33 and the transfer valve 22 and opening the service valve 30 and the feed valve 24. The step is preferably timed to maintain sufficient pressure in the system to assure retention of the pre-coat layer 45 on the filter screens 40. In this manner, untreated condensate water enters the filter system through the feed line 23 and passes through the transfer line 21 and the inlet lines 12 and 13 into the filter tank 10. The pressure of the incoming untreated water forces it through the resin pre-coat layer 45, the filter screen 40, the chamber 50 and the outlet header 16.

As the untreated water passes through the pre-coat layer 45, an ion exchange reaction takes place to remove dissolved impurities from the water. In addition, undissolved impurities are removed from the untreated water by virtue of the water passing through the filter screens 40 and the pre-coat layer 45 of anion and cation finely divided exchange resin particles. Filter cake 46, consisting of the undissolved impurities, builds up within and on the pre-coat layer 45 as the process continues. The purified or treated water flows from the chamber 50 through the outlet header 16 and the outlet line 14 to the service line 26. The purified water is directed to a supply tank or suitable equipment by the service line 26.

Eventually the resins will become exhausted and must be regenerated or discarded. At this time the filtering step is stopped by closing the intake valve 24 and the service valve 30. The vent valve 34 and the drain valve 35 are opened to drain the filter tank 10. The finely divided ion exchange resin particles are recovered from the drain water and regenerated. The filters 15 are washed by an internal washing system not described or shown and not forming a part of the present invention. Another charge of mixed anion and cation exchange resin particles in the size range of about 60 to 400 mesh is then placed in the pre-coated tank 17 and the process of slurrying, clarifying, pre-coating and filtering described in detail hereinbefore is repeated. Preferably several charges of resin particles are available to decrease down time and allow restarting the process while the exhausted resins are being separately regenerated.

In this manner, an impurity-bearing condensate water is treated to remove insoluble and soluble impurities. For example, soluble silicas, chloride compounds, compounds of calcium and magnesium, such as the sulfates and bicarbonates, and the like, may be removed from a water stream by a filter screen having a pre-coat comprising a mixture of finely divided anion and cation exchange resin particles. Also, substantial removal of undissolved impurities, such as colloidal silica, iron and copper, may be achieved.

The cation finely divided resin particles should be about 1 to 99% by weight of the finely divided resin particles in the mixture. Preferably the cation finely divided resin particles comprise, on a weight basis, in the range of about 10 to 90% and more preferably in the range of about 50 to 90%. About 50% cation finely divided resin particles by weight is the most preferred mixture.

Typical solid cation exchange resin particles which may be employed in the present invention are the divinylbenzene-styrene copolymer type, the acrylic type, the sulfonated coal type and the phenolic type. These may be used in the sodium, hydrogen, ammonium or hydrazine form, for example. Typical solid anion exchange resin particles that may be employed in the present invention are the phenolformaldehyde type, the divinylbenzene-styrene copolymer type, the acrylic type and the epoxy type. The anion resin particles may be used in the hydroxide or chloride form, for example. These anion and cation resin compositions are well known in the art in the large bead form, i.e., in the size range of 20 to 50 mesh. For example, such resins are sold in the large bead form under the tradenames of Amberlite IS–120 and Amberlite IRA–400, manufactured and sold by Rohm & Haas Company, and Nalco HCR and Nalco SBR–P, sold by Nalco Chemical Company. The finely divided resins employed in the present invention are made by grinding these well known large bead resins to the desired size range. During the grinding, resin particles smaller than 400 mesh are produced. Suitable methods well known to one with ordinary skill in the art, such as liquid settling, air classification or the like, are utilized to remove as much of the resin particles smaller than 400 mesh as is practical. However, these resin particles in the size range of about 60 to 400 mesh will contain about 0.5 to 10% by weight resin particles smaller than 400 mesh even after such treatment. These finely divided resin particles may be regenerated and washed prior to use as with the large bead resin particles. During the classification resin particle fines in the size range of about 5 to 37 microns may be segregated for use in accordance with the method of the present invention.

The filter screens shown in the drawings represent only one possible embodiment in the filter screens 40 may be annular, conical or other shapes without departing from the spirit of the present invention. Furthermore, though in this embodiment a pre-coat slurry was independently circulated to pre-coat the filter screens 40 in advance of the introduction of feed water, the finely divided resin particles may be mixed directly into the feed water at the start of the run with similar results, so long as the necessary cation or anion resin particle fines are added to the feed water in the desired amount determined in the manner previously disclosed. In addition, after a pre-coat layer has been formed, additional mixed finely divided resin particles may be added to the feed water prior to the feed water passing through the pre-coat layer and filter screen, it being only necessary that sufficient the requisite cation or anion resin particle fines is also added to the system.

Some of the advantages of the present invention will be seen from the following examples:

EXAMPLE I

In these tests a plurality of mixtures of anion and cation resin particles in the size range of about 60 to 400 mesh and containing anion and cation resin particles fines (anion and cation resin particles smaller than about 400 mesh) were clarified. Ammonium-form, strong acid, divinylbenzene-styrene copolymer-type cation resin particles and hydroxide-form, strong base, divinylbenzene-styrene copolymer-type anion resin particles were used. The fines content of the finely divided resin particles was determined by mixing the resin particles in demineralized water, allowing the mixture to settle overnight, evaporating the decanted supernatant and weighting the residue from evaporation.

Measured quantities of the cation and anion finely divided resin particles were mixed in graduated cylinders each containing the same measured quantity of demineralized water. In each instance, when allowed to settle for 5–10 minutes, a cloudy supernatant was formed, Anion or cation resin particle fines in the size range of about 5 to 37 microns were added in small increments to the cylinders. The cylinders were shaken and then the contents were allowed to settle for 5–10 minutes and the supernatant observed. This procedure was repeated until the supernatant was visually observed to be clear.

The amounts and results of these tests are given in Table A:

TABLE A.—CLARIFYING VARIOUS MIXTURES OF ANION AND CATION RESIN PARTICLES

| Mixture No. | Ratio Cation to Anion, Dry Wt. Basis | Total Wt. Cation, gms. | Total Wt. Anion, gms. | Cation Fines, gms. | Anion Fines, gms. | Anion (A) ors Cation (C) Fines Added to Clarify, gm. |
|---|---|---|---|---|---|---|
| 1 | 10/90 | 11.25 | 11.25 | .0043 | 1.1271 | 0.0918 (C) |
| 2 | 25/75 | 3.12 | 9.37 | .0106 | 0.9304 | 0.0627 (C) |
| 3 | 50/50 | 6.25 | 6.25 | .0213 | 0.6206 | 0.0288 (C) |
| 4 | 90/10 | 11.25 | 1.25 | .0383 | 0.1240 | 0.0313 (A) |

These tests establish that the addition of anion or cation resin particle fines in the size range of about 5 to 37 microns will clarify the supernatant formed by settling a slurry of said finely divided resin particles.

EXAMPLE II

The purification system employed for this series of tests was generally similar to the system illustrated in FIGURE 1, but on a reduced scale. The system comprised a Lucite filter tank having a single nylon-wound annular filter screen having a two-inch diameter and a height of ten inches. The system included a pre-coat tank with a pump, a slurry line interconnecting the pre-coat tank with the pump, a transfer line interconencting the pump with an inlet line into the filter tank, and an outlet line from the filter tank which was connected with a pre-coat return line which, in turn led back to the pre-coat tank. A bridge line interconnected the pre-coat return line with the slurry line. All lines had suitable valves.

In each run the mixture was 20 gms. on a dry weight basis of anion finely divided resin particles and 20 gms. on a dry weight basis of cation finely divided resin particles, both the anion and cation resin particles containing anion and cation resin particles smaller than 400 mesh, respectively. Hydroxide-form, strong base, divinyl-benzene-styrene copolymer-type anion resin particles and ammonium-type, strong acid, divinylbenzene-styrene copolymer type cation resin particles were used. By the same procedure utilized in Example I it was determined that 13 grams of finely divided cation exchange resin particles, which contained 1.4% by weight of cation fines, were required to clarify the supernatant.

The cation and anion resin particles and added resin particle fines (clarifier), if any, were mixed, placed into the pre-coat tank to form a slurry and then pre-coated on the filter. The flow rate was maintained at 1 g.p.m. (2.3 g.p.m./ft.$^2$) for 15 minutes until pre-coating was completed and then the pressure drop across the pre-coat layer was recorded at 15-minute intervals. The pressure drop at 2 g.p.m. (4.6 g.p.m./ft.$^2$) was obtained at the same time by increasing the flow rate for the pressure drop reading and then returning the flow rate to 1 g.p.m.

The amounts and results of these tests are shown in Table B:

TABLE B.—THE EFFECT OF THE ADDITION OF FINES ON PRESSURE DROP OF PRE-COAT LAYER

|  | Run Number | | | | |
| --- | --- | --- | --- | --- | --- |
|  | 1 | 2 | 3 | 4 | 5 |
| Cation Resin Particles, dry grams | 20 | 20 | 20 | 20 | 20 |
| Anion Resin Particles, dry grams | 20 | 20 | 20 | 20 | 20 |
| Dry Weight Ratio Cation to Anion | 1.0 | 1.0 | 1.0 | 1.0 | 1.0 |
| Gms. Clarifier Added | 0 | 13.0 | 26.0 | 78.0 | 104 |
| Average Pressure Drop Across Pre-coat Layer at 2.3 g.p.m./ft.$^2$, p.s.i | 3.5 | 1.0 | 2.5 | 7.0 | 12.0 |
| Average Pressure Drop Across Pre-coat Layer at 4.6 g.p.m./ft.$^2$, p.s.i | 6.9 | 3.5 | 5.0 | 14.0 | 24.5 |

It is evident from the data of Table B that the minimum pressure drop was obtained in Run 2, i.e., when that amount of cation resin particle fines added to the slurry was that necessary to form a clear supernatant. If an insufficient amount of fines was added to the slurry or if an excess amount of fines, a higher pressure drop resulted.

While the embodiment described herein is at present considered to be preferred, it will be understood that various modifications and improvements may be made therein and it is intended to cover in the appended claims all such modifications and improvements as fall within the true spirit and scope of the invention.

What is claimed is:

1. In a liquid treating process comprising passing the liquid through a bed comprising a mixture of finely divided cation and anion exchange resin particles in the size range of about 60 to 400 mesh, said bed containing anion and cation resin particle fines smaller than 400 mesh, the method of reducing the pressure drop across said bed comprising prior to forming said bed determining the type and relative amount of excess resin particle fines in a liquid slurry of said mixture of resin particles and adding a predetermined amount of the other type of resin particle fines in the size range of about 5–37 microns to said mixture of resin particles so that a clear supernatant would form upon settling of a slurry of said mixture.

2. A method of preparing a mixture of finely divided cation and anion exchange resin particules for pre-coating a filter screen, said finely divided resin particles being in the size range of about 60 to 400 mesh and having therewith anion and cation resin particle fines smaller than 400 mesh, comprising the steps of mixing said finely divided resin particles in a liquid to form a slurry, determining the type and relative amount of excess resin particle fines in said slurry and then adding a predetermined amount of the other type of particle fines in the size range of about 5 to 37 microns to said slurry so that a clear supernatant would form upon settling of said slurry.

3. A method of preparing a slurry of a mixture of finely divided anion and cation resin particles in the size range of about 60 to 400 mesh, said resin particles containing anion and cation resin particle fines smaller than 400 mesh, comprising mixing said anion and cation finely divided resin particles in a slurry liquid to form a measured amount of homogeneous slurry, withdrawing a portion of said slurry, dividing said portion of said slurry into two measured slurry samples, allowing said two slurry samples to settle, adding cation resin particle fines in the size range of about 5 to 37 microns to one of said slurry samples and adding anion resin particle fines in the size range of about 5 to 37 microns to the other of said slurry samples to determine which of said resin particle fines clears the supernatant formed upon settling said slurry samples, determining the amount of said anion or cation resin particle fines necessary to clear the respective supernatant of its respective slurry sample and adding a proportionate amount of said anion or cation fines to said slurry.

4. The method of claim 3 wherein said mixture of finely divided anion and cation resin particles contain in the range of about 0.5 to 10% by weight or resin particles smaller than 400 mesh prior to adding resin particle fines to said mixture.

5. A method for treating a liquid to remove impurities therefrom comprising preparing a slurry of a mixture of finely divided anion and cation resin particles in the size range of about 60 to 400 mesh, said resin particles containing anion and cation resin particle fines smaller than 400 mesh, by mixing said anion and cation finely divided resin particles in a slurry liquid to form a measured amount of slurry, withdrawing a portion of said slurry, dividing said portion of said slurry into two measured slurry samples and settling said two slurry samples, adding caton resin particle fines in the size range of about 5 to 37 microns to one of said slurry samples and adding anion resin particles fines in the size range of about 5 to 37 microns to the other of said slurry samples to determine which of said resin particle fines clears the supernatant formed upon settling said slurry samples, determining the amount of said anion or cation resin particle fines ecessary to clear the respective supernatant of its respective slurry sample and adding a proportionate amount of said anion or cation fines to said slurry, forming a pre-coat layer on a filter screen with said resin particles in said slurry and passing said liquid through said pre-coat layer and filter screen to remove impurities therefrom.

6. In the process for removing impurities from a first liquid by passing said first liquid through a mixture of finely divided anion and cation resin particles in the size range of about 60 to 400 mesh, said mixture containing anion and cation resin particle fines smaller than 400 mesh, the method of reducing the pressure drop through said mixture comprising mixing said anion and cation finely divided resin particles in a second liquid to form a measured amount of homogeneous slurry, withdrawing a portion of said slurry, dividing said portion into two measured slurry samples, allowing said two slurry samples to settle, adding cation resin particle fines in the size range of about 5 to 37 microns to one of said slurry samples and adding anion resin particle fines in the size range of about 5 to 37 microns to the other of said slurry samples to determine which of said resin particle fines clears the supernatant formed upon settling said slurry samples, determining the amount of said anion or cation resin particle fines necessary to clear the respective supernatant of its respective slurry samples and adding a proportionate amount of said anion or cation fines to said slurry, forming a pre-coat layer on a filter screen with said resin particles in said slurry and passing said first liquid through said pre-coat layer and filter screen to remove impurities therefrom.

References Cited
UNITED STATES PATENTS

| | | | |
|---|---|---|---|
| 3,250,702 | 5/1966 | Levendusky | 210—24 |
| 3,250,703 | 5/1966 | Levendusky | 210—37 X |
| 3,250,704 | 5/1966 | Levendusky | 210—37 X |
| 3,250,705 | 5/1966 | Levendusky | 210—37 X |

SAMIH N. ZAHARNA, *Primary Examiner.*